United States Patent [19]

Marchionni et al.

[11] Patent Number: 5,319,147
[45] Date of Patent: Jun. 7, 1994

[54] PROCESS FOR THE NEUTRALIZATION OF PERFLUOROPOLYOXYALKYLENES

[75] Inventors: Giuseppe Marchionni; Ugo De Patto, both of Milan, Italy

[73] Assignee: Ausimont S.p.A., Milan, Italy

[21] Appl. No.: 994,663

[22] Filed: Dec. 22, 1992

[30] Foreign Application Priority Data

Dec. 23, 1991 [IT] Italy ................. MI91 A 003464

[51] Int. Cl.$^5$ ................. C07C 41/48; C07C 41/01
[52] U.S. Cl. ................. 568/601; 568/603; 568/604; 568/615
[58] Field of Search ............... 568/615, 601, 603, 604

[56] References Cited

U.S. PATENT DOCUMENTS

| | | |
|---|---|---|
| 3,665,041 | 5/1972 | Sianesi et al. . |
| 3,985,810 | 10/1976 | von Halasz et al. . |
| 4,523,039 | 6/1985 | Lagow et al. . |
| 4,664,766 | 5/1987 | Marchionni et al. . |
| 4,755,330 | 7/1988 | Viola et al. . |
| 4,847,427 | 7/1989 | Nappa . |

FOREIGN PATENT DOCUMENTS

| | | |
|---|---|---|
| 0148482 | 12/1984 | European Pat. Off. . |
| 805503 | 12/1958 | United Kingdom . |
| 1000485 | 8/1965 | United Kingdom . |
| 1226566 | 4/1968 | United Kingdom . |

OTHER PUBLICATIONS

Cotton et al, Advanced Inorganic Chemistry, 2nd Revised Ed. Interscience Publishers, New York, 1966, p. 385.

*Primary Examiner*—Howard T. Mars
*Attorney, Agent, or Firm*—Bryan Cave

[57] ABSTRACT

Perfluoropolyoxyalkylenes containing acid and/or ketonic groups are neutralized by reacting same in the liquid phase with elemental fluorine at temperatures of from $-20°$ to $+150°$ C. in the presence of a supported catalyst consisting of fluorides of Ag, Pb, Co, Ni, Cu, Mn, V, Cr, or Fe.

In a preferred embodiment, a mixture of fluorides of the above mentioned metals and of fluorides, or fluoride precursors, of an alkali and/or alkaline-earth metal is used as catalyst, optionally supported on a suitable carrier.

5 Claims, No Drawings

PROCESS FOR THE NEUTRALIZATION OF PERFLUOROPOLYOXYALKYLENES

The present invention relates to a process for preparing fully fluorinated perfluoropolyoxyalkylenes by neutralization of the functional groups contained therein with fluorine.

The perfluoropolyoxyalkylenes are products known in the art.

They consist of repeating monomeric units having at least one of the following structures:

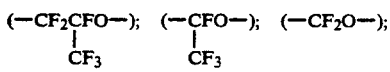

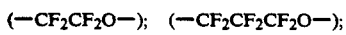

Depending on the type and combination of such monomeric units in the macromolecule, the perfluoropolyoxyalkylenes are commercially known under the names Fomblin® Y, Fomblin® Z, Fomblin® K, Galden®, Demnum®, Krytox®.

They may be prepared by means of various technologies, which are described in several patents such as U.S. Pat. Nos. 4,523,039; 3,665,041 and European patent application No. 148,482.

Irrespective of the type of technology utilized for their preparation, in order to obtain chemically inert perfluoropolyoxyalkylenes it is necessary to carry out on them a neutralization of the functional groups contained therein, which consist for the most part of acid groups —COF and ketonic groups —COCF$_3$.

For this purpose, several methods have been suggested. One of them comprises treating the perfluoropolyoxyalkylenes with KOH at temperatures from 130° to 250° C. Such method involves the formation of hydrogenated groups such as —CF$_2$H, —CFHCF$_3$, which may be undesirable. Furthermore, the application of such method to low molecular weight perfluoropolyoxyalkylenes requires the use of rather high pressures, which is not practical.

Another method (British patent No. 1,226,566) consists in reacting the perfluoropolyoxyalkylenes with fluorine at 50°-250° C. However, this method requires operation at low temperatures when the perfluoropolyoxyalkylenes have a low molecular weight, which results in a low reaction rate.

A third method (U.S. Pat No. 4,664,766) consists in reacting the perfluoropolyoxyalkylenes with fluorine in the presence of U.V. radiations having a λ ranging from 200 to 600 nm; however, it is well suited only for low molecular weight products.

U.S. Pat. No. 4,847,427 suggests the fluorination with elemental fluorine in the presence of alkali or alkaline earth-metal fluorides. According to such process, the perfluoropolyoxyalkyene acid groups are first hydrolized to —COOH groups, then the fluorination is carried out at 50°-300° C. in the presence of the abovesaid fluorides, which are in amounts near the stoichiometric amounts.

This process exhibits the drawback of releasing great amounts of hydrofluoric acid both during the hydrolysis step and during the fluorination step.

Lastly, from U.S. Pat. No. 3,985,810 it is known to convert acid perfluoropolyoxyalkylenes of formula:

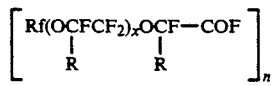

(Rf=C$_1$-C$_9$ perfluoroalkyl; n=1-2; R=F, CF$_3$; x=0-50) into neutral products, by fluorination of the alkyl fluoro-groups with elemental fluorine, at temperatures from 50° to 350° C., in the presence of catalysts composed of metals of Groups I B through VIII of the Periodic System, among which Ag.

In such case the fluorination reaction is too slow, particularly at the lowest temperatures, therefore the process cannot be practised on an industrial scale.

The Applicant has now found a process—which is the object of the present invention—not affected with the above-mentioned drawbacks, for thoroughly neutralizing perfluoropolyoxyalkylenes of general formula:
(A) B—Rf—T, in which:
T can be one of the following end groups: —COF, —CFXCOF, -CF$_2$COCF$_3$, —CF$_2$CF$_2$COF; (X=F, CF$_3$)
B can be —Cl, —OCF$_3$, —OC$_2$F$_5$, —OC$_3$F$_7$, or a —OT group
Rf is a perfluoropolyoxyalkylene chain having one of the following formulas:

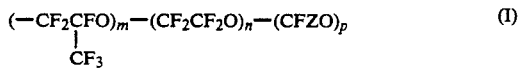

where Z=F, CF$_3$; m, n, p are numbers which can be, not all simultaneously, also=0 and exhibit in particular the following values:
(1) when n=0, Z is=F, CF$_3$, m and p are such that m/p is >3
(2) when m=0, Z is=F, n and p are such that n/p ranges from 0.3 to 5
(3) when m, n, p are different from zero, the n/p ratio and the m/n+p ratio range from 1 to 10.

the number average molecular weight of Rf in formulas (I) and (II) ranging from 300 to 20,000. This process consists in reacting such perfluoropolyoxyalkylenes in the liquid phase with elemental fluorine, at temperatures ranging from −20° C. to 150° C., preferably from 20° C. to 100° C. and more preferably from 20° C. to 45° C., in the presence of a supported catalyst composed of Ag, Pb, Ni, Co, Cu, Mn, V, Fe, or Cr fluorides, either individually or in admixture with one another.

In particular, the process of the present invention permits operation in comparison with the methods of the prior art, with simpler and more economic reactors than the ones in which they are operated with U.V. radiations. Furthermore it permits prevention of an evolvement of HF and eliminates the necessity to carry out hydrolysis reactions, as occurs in the process of U.S. Pat. No. 4,847,427, and, lastly, operates with extremely high reaction rates, even at low temperatures, so that it is possible to fluorinate also low real molecular weight products.

The fluorides to be utilized as catalysts are used in a supported form. Suitable carriers are: AlF$_3$, alumina or at least partially fluorinated alumina, fluorinated polymers such as polytetrafluoroethylene. Particularly preferred is $AlF_3$.

The preferred catalyst is Ag fluoride supported on $AlF_3$.

Preferably, such fluorides are utilized in amounts ranging from 0.1 to 5% by weight calculated on perfluoropolyoxyalkylene.

The mixtures of the abovesaid fluorides with the fluorides, or the fluoride precursors, of the alkali and/or alkaline earth metals, either as such or supported, have proved to be particularly active as catalysts.

Thus, a further object of the present invention is a process for carrying out the neutralization of the above-cited perfluoropolyoxyalkylenes, by means of elemental fluorine, at temperatures from $-20°$ C. to $150°$ C. preferably from $20°$ C. to $100°$ C., and more preferably from $20°$ C. to $45°$ C., in the presence of a catalyst comprising:

a) at least an Ag, Pb, Co, Cu, Ni, Mn, V, Fe, or Cr fluoride, and
b) at least a fluoride, or a precursor of a fluoride, of and alkali or alkaline earth metal.

Examples of fluorides of group (b) are represented by KF, NaF, LiF, CsF, $CaF_2$, $MgF_2$.

By precursors of the alkali or alkaline earth-metals are meant here the compounds of said metals that can be converted to fluorides by reaction with fluorine under the fluorination conditions of the perfluoropolyoxyalkylenes according to the present invention.

The alkali metal fluorides or alkaline-earth metal fluorides can be utilized as such, or carried on a carrier selected from those described above for fluorides (a). A preferred carrier is $AlF_3$.

Preferably they are used in amounts ranging from 5 to 70%, and more preferably from 10 to 60% by weight calculated on the sum of their weight with fluoride (a).

The fluorination reaction according to the process of the invention is effected by placing the catalyst into the liquid perfluoropolyoxyalkylene to be neutralized, and by causing gaseous fluorine, optionally diluted with an inert gas such as e.g. nitrogen, to flow therethrough, maintaining the liquid phase at a temperature ranging from $-20°$ to $150°$ C., preferably from $20°$ to $100°$ and more preferably from $20°$ C. to $45°$ C. The preferred reaction temperatures can be selected time by time in said ranges, depending on the nature and molecular weight of the perfluoropolyoxyalkylene.

The following examples are given to illustrate the present invention, without limiting, however, the scope thereof.

EXAMPLE 1

Operating according to the method described in U.S. Pat. No. 4,755,330, a sample of 2 kg of perfluoropolyoxyalkylene (oil) having a viscosity of 1.76 cSt at $20°$ C. was obtained. The NMR analysis of this product revealed a structure B—$(CF_2CF(CF_3)O)_m$—T having a number average molecular weight equal to 575; further it revealed the presence of end groups B, T=$OCF_3$ (15%), $OC_2F_5$(36%), $OC_3F_7$ (30.5%); $OCF(CF_3)COF$ (5.5%) and (ketonic end groups) $OCF_2COCF_3$ (13%).

The potentiometric titration of the product indicated an acidity equal to 0.38 meq/g of perfluoropolyoxyalkylene (oil).

200 g of this sample were placed into a glass reactor having a 250 ml volume and equipped with stirrer and cooler. 2 g of AgF were introduced into the reactor. The temperature was then brought to $80°$ C. by means of a thermostatic bath, and a mixture of elemental fluorine diluted with nitrogen in a $F_2/N_2$ volumetric ratio equal to ⅓ was made to flow at a rate of 4 l/h for total 49 hours.

After such stretch of time the mass was filtered and 173.2 g of product were obtained (yield=86.6%). The NMR analysis and IR analysis of the product revealed the complete disappearance of the acyl fluoride end groups and of the ketones. The acidity degree was lower than $5·10^{-4}$ meq/g of oil. The iodometric titration indicated an active oxygen content (attributable to the presence of hypofluorites or peroxides) equal to zero.

The conversion was of 3.5 g/h.

EXAMPLE 2

Comparative 200 g of the perfluoropolyoxyalkylene described in example 1 were introduced into a glass 250-ml reactor equipped with stirrer and cooler. The temperature was then brought to $130°$ C. by means of a thermostatic bath and a mixture of elemental fluorine diluted with nitrogen in a volumetric ratio equal to ⅓ was made to flow at a rate of 4 l/h for total 80 hours.

After such stretch of time, the recovered mass did not exhibit any alterations. 199 g of product were obtained (yield =99.5%). The acidimetric analysis, NMR analysis and IR analysis of the product revealed the presence of the initial acyl fluorides and of the initial ketones.

EXAMPLE 3

200 g of the perfluoropolyoxyalkylene described in example 1 were introduced into a glass 250 ml reactor equipped with stirrer and cooler. 4 g of AgF were introduced into the reactor. It was brought to a temperature of $40°$ C. by means of a thermostatic bath, and a mixture of elemental fluorine diluted with nitrogen in a ⅓ ratio was made to flow at a rate of 4 l/h for total 76 hours.

After such stretch of time the mass was filtered and 168.9 g (yield=84.4%) of product were obtained. The NMR analysis and the IR analysis of the product revealed the complete disappearance of the ketonic end groups and of the acyl fluoride end groups. The acidimetric titration indicated an acidity lower than $5·10^{-4}$ meq/g of oil. The iodometric titration indicated an active oxygen content (atributable to the presence of hypofluorites or peroxides) equal to zero.

The conversion was equal to 2.2 g/h.

EXAMPLE 4

200 g of the perfluoropolyoxyalkylene described in example 1 were introduced into a glass 250 ml reactor equipped with stirrer and cooler. 2 g of AgF and 2 g of KF were introduced into the reactor. The temperature was maintained at $20°$ C. by means of a thermostatic bath, and a mixture of elemental fluorine diluted with nitrogen in a ⅓ ratio was made to flow at a rate of 4 l/h for total 49 hours.

After such stretch of time the mass was filtered and 180 g (yield=90%) of product were obtained. The NMR and IR analyses of the product revealed the disappearance of the ketone and acyl fluoride end groups. The titration indicated an acidity lower than $5·10^{-4}$ meq/g of oil. The NMR analysis and the iodometric analysis revealed that hypofluorite end groups were fully absent.

The conversion was of 3.6 g/h.

EXAMPLE 5

Comparative 200 g of the perfluoropolyoxyalkylene described in example 1 were introduced into a glass 250 ml reactor equipped with stirrer and cooler. 6.4 g of KF were introduced into the reactor. The temperature was then brought to 40° C. by means of a thermostatic bath, and a mixture of elemental fluorine diluted with nitrogen in a ⅓ ratio was made to flow at a rate of 4 l/h for total 20 hours.

After such stretch of time the mass was filtered, and 195.3 g (yield=97.6%) of product were obtained. The NMR analysis and the IR analysis of the product revealed the complete disappearance of the ketone and COF end groups and the presence of hypofluorite end groups. The iodometric titration indicated an active oxygen content equal to 0.26%.

EXAMPLE 6

200 g of the perfluoropolyoxyalkylene described in example 1 were introduced into a glass 250 ml reactor equipped with stirrer and cooler. 0.2 g of AgF supported on 1.8 g of AlF$_3$ (commercially designated as MUC 4), having a surface area of 15 m$^2$/g were introduced into the reactor. The whole was then brought to a temperature of 80° C. by means of a thermostatic bath, and a mixture of elemental fluorine diluted with nitrogen in a ⅓ ratio was made to flow at a rate of 4 l/h for total 20 hours.

After such stretch of time the mass was filtered and 176.9 g (yield=88.4%) of product were obtained. The NMR analysis and IR analysis of the product revealed the complete disappearance of the ketonic and acyl fluoride end groups. The acidimetric titration indicated an acidity lower than 5·10$^{-4}$ meq/g of oil. The NMR analysis and the iodometric analysis indicated that hypofluorite end groups were fully absent.

The conversion was equal to 8.8 g/h.

EXAMPLE 7

200 g of the perfluoropolyoxyalkylene utilized in example 1 were introduced into a glass reactor having a volume of 250 ml, equipped with stirrer and cooler. 0.2 g of AgF and 0.2 g of KF supported on 1.6 g of AlF$_3$ having a surface area of 15 m$^2$/g were introduced into the reactor. The whole was then brought to a temperature of 80° C. by means of a thermostatic bath, and a mixture of elemental fluorine diluted with nitrogen in a ⅓ ratio was fed at a rate of 4 liters/hour—for a total time of 11 hours.

After such stretch of time the mass was filtered and 186.9 g (yield=93.4%) of product were obtained. The NMR analysis and IR analysis of the product revealed the complete disappearance of the ketone and acyl fluoride end groups. The acidimetric titration indicated an acidity lower than 5·10$^{-4}$ meq/g of oil. The NMR analysis and the iodometric analysis revealed that hypofluorite end groups were fully absent.

The conversion was equal to 16.9 g/h.

EXAMPLE 8

A sample of a perfluoropolyoxyalkylene having structure BO—(CF$_2$CF$_2$O)$_n$(CF$_2$O)$_p$—T with n/p =0.96 and T, B=CF$_2$COF, CF$_3$, —COF, —CF$_2$Cl —CF$_2$CF$_2$Cl was prepared by photooxidation of tetrafluoroethylene at −38° C. and subsequent thermal treatment of the resulting product in order to remove the peroxide oxygen contained therein, according to methods of the art.

The product exhibited a number average molecular weight equal to 7,500 and an acidity of 0.14 meq/g of perfluoropolyoxyalkylene.

200 g of this sample were introduced into a glass reactor having a 250 ml volume, equipped with stirrer and cooler. 2 g of AgF were introduced into the reactor. The whole was brought to a temperature of 80° C. by means of a thermostatic bath and a mixture of elemental fluorine diluted with nitrogen in a F$_2$/N$_2$ volumetric ratio=⅓ was made to flow at a rate of 4 l/h for total 49 hours.

After such stretch of time the mass was filtered and 188.6 g (yield=94.3%) of product were obtained. The NMR and IR analyses of the product revealed a full disappearance of the acyl fluoride end groups. The titration indicated an acidity lower than 5·10$^{-4}$ meq/g of oil.

The NMR analysis and the iodometric analysis revealed the full absence of hypofluorite end groups.

The conversion was equal to 3.8 g/h.

EXAMPLE 9

200 g of a perfluoropolyoxyalkylene having structure BO—(CF$_2$CF$_2$CF$_2$O)$_n$—T with B, T=—CF$_2$CF$_2$COF, —C$_2$F$_5$, —C$_3$F$_7$ were prepared according to the modalities described in European patent application No. 148,482, and by subsequent reduction of the molecular weight of the obtained product by means of treatment with AlF$_3$ at 270° C., according to conventional techniques. The perfluoropolyoxyalkylene exhibited a number average molecular weight equal to 540 and an acidity of 3.37 meq/g of perfluoropolyoxyalkylene.

The sample was introduced into a glass reactor having a volume of 250 ml and equipped with stirrer and cooler. 2 g of AgF were put into the reactor. The whole was brought to a temperature of 80° C. by means of a thermostatic bath, and a mixture of elemental fluorine diluted with nitrogen in a ⅓ volumetric ratio was made to flow at a rate of 4 l/h for total 56 hours.

After such stretch of time the mass was filtered and 181.2 g (yield=90.6%) of product were obtained. The NMR and IR analyses of the product revealed the total disappearance of the acyl fluoride end groups. The titration indicated an acidity lower than 5·10$^{-4}$ meq/g of oil.

The NMR analysis and the iodometric analysis revealed the full absence of hypofluorite end groups.

The conversion was 3.2 g/h.

EXAMPLE 10

By photooxidation at −40° C. of a mixture of tetrafluoroethylene and hexafluoropropene, a peroxide perfluoropolyoxyalkylene was obtained which, after thermal treatment, exhibited a viscosity of 258 cSt and a number average molecular weight equal to 2,960.

The structure determined by means of NMR is represented by the formula: BO—(CF$_2$CF(CF$_3$)O)$_m$(CF$_2$CF$_2$O)$_n$(CF$_2$O)$_p$—T, where m/n/p=1.0/0.8/0.2 and B, T=CF(CF$_3$)COF, CF$_2$COF, COF, CF$_3$, C$_2$F$_5$, C$_3$F$_7$, CF$_2$COCF$_3$. The product exhibited an acidity equal to 0.74 meq/g of oil.

200 g of this sample were placed into a glass reactor having a 250 ml volume, equipped with stirrer and cooler. 2 g of AgF were introduced into the reactor. The whole was brought to a temperature of 80° C. by means of a thermostatic bath and a mixture of elemental fluorine diluted with nitrogen in a ⅓ volumetric ratio was made to flow at a rate of 4 l/h for total 49 hours.

After such stretch of time the mass was filtered and 194 g (yield=97.0%) of product were obtained. The NMR and IR analyses of the product revealed the complete disappearance of the ketone and acyl fluoride end groups. The titration indicated an acidity lower than $5 \cdot 10^{-4}$ meq/g of oil. The NMR analysis and the iodometric analysis revealed the full absence of hypofluorite end groups.

The conversion was equal to 3.9 g/h.

EXAMPLE 11

200 g of the perfluoropolyoxyalkylene described in example 10 were introduced into a glass reactor having a 250 ml volume, equipped with stirrer and cooler. 2 g of AgF were introduced into the reactor along with 2 g of KF. The temperature was maintained at 40° C. by means of a thermostatic bath and a mixture of elemental fluorine diluted with nitrogen in a ⅓ ratio was fed at a rate of 4 l/h for total 35 hours.

After such stretch of time the mass was filtered and 181.3 g (yield=90.6%) of product were obtained. The NMR analysis and the IR analysis of the product revealed the disappearance of the ketone and acyl fluoride end groups. The titration indicated an acidity lower than $5 \cdot 10^{-4}$ meq/g of oil.

The NMR analysis and the iodometric analysis revealed the full absence of hypofluorite end groups.

The conversion was equal to 5.18 g/h.

EXAMPLE 12

200 g of the perfluoropolyoxyalkylene obtained according to example 1 were introduced into a glass reactor having a volume of 250 ml, equipped with stirrer and cooler. 2 g of AgF and 2 g of KF were introduced into the reactor. The temperature was maintained at 80° C. by means of a thermostatic bath and a mixture of elemental fluorine diluted with nitrogen in a ⅓ ratio was made to flow at a rate of 4 l/h for total 25 hours.

After such stretch of time the mass was filtered and 183 g (yield=91.5%) of product were obtained. The NMR analysis and the IR analysis of the product evidenced the disappearance of the ketone and acyl fluoride end groups. The titration indicated an acidity lower than $5 \cdot 10^{-4}$ meq/g of oil.

The NMR analysis and the iodometric analysis revealed the full absence of hypofluorite end groups.

The conversion was equal to 7.3 g/h.

EXAMPLE 13

200 g of the perfluoropolyoxyalkylene obtained according to the modalities of example 1 were introduced into a glass reactor having a 250 ml volume, equipped with stirrer and cooler. 2 g of $NiF_2$ and 2 g of KF were placed into the reactor. The temperature was maintained at 20° C. by means of a thermostatic bath, and a mixture of elemental fluorine diluted with nitrogen in a ⅓ ratio was made to flow at a rate of 4 l/h for total 60 hours.

After such stretch of time the mass was filtered and 175 g (yield=87.5%) of product were obtained. The NMR analysis and IR analysis of the product revealed that the ketonenic and acyl fluoride end groups had disappeared. The titration indicated an acidity lower than $5 \cdot 10^{-4}$ meq/g of oil.

The NMR analysis and the iodometric analysis revealed the full absence of hypofluorite end groups.

The conversion was equal to 2.9 g/h.

We claim:

1. A process for neutralizing perfluoropolyoxyalkylenes of general formula:
(a) B—Rf—T, in which
   T is one of the following end groups: —COF, —CFXCOF, —$CF_2COCF_3$, $CF_2CF_2COF$; (X=F, $CF_3$)
   B is Cl, —$OCF_3$, —$OC_2F_5$, —$OC_3F_7$, or a —OT group
   Rf is a perfluoropolyoxyalkylene chain having one of the following formulas:

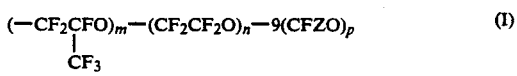

(I)

where Z=F, $CF_3$; m, n, p are numbers which are, not all similtaneously, also=O and exhibit in particular the following followings:
   (1) when n=O, X is=F, $CF_3$, m and p are such that m/p is >3
   (2) when m=O, Z is=F, n and p are such that n/p ranges from 0.3 to 5
   (3) when m, n, p are different from zero, the np ratio and the m/n+p ratio range from 1 to 10.

(II)

which process consists in reacting such perfluoropolyoxyalkylenes in the liquid phase with elemental fluorine, at temperatures ranging from −20° to 150° C. in the presence of a catalyst comprising:
   (a) a fluoride of a metal selected from the group consisting of Ag, Pb, Co, Cu, Ni, Mn, V, Fe, Cr, and mixtures thereof; and
   (b) a fluoride, or a precursor of a fluoride, of an alkali or alkaline-earth metal.

2. The process of claim 1, wherein the catalyst is supported on a carrier selected from: $AlF_3$, alumina, partially fluorinated alumina, polytetrafluoroethylene.

3. The process of claim 2, wherein the carrier is $AlF_3$.

4. The process according to claim 1, wherein the reaction temperature is from 20° to 100° C.

5. The process of claim 4, wherein the reaction temperature is from 20° to 45° C.

* * * * *

UNITED STATES PATENT AND TRADEMARK OFFICE
CERTIFICATE OF CORRECTION

PATENT NO. : 5,319,147

DATED : June 7, 1994

INVENTOR(S) : Marchionni et al

It is certified that error appears in the above-indentified patent and that said Letters Patent is hereby corrected as shown below:

Column 8, line 25, delete "9".
Column 8, line 31, delete "followings" and insert --values--.
Column 8, line 41, insert -- the number average molecular weight of Rf in formulas (I) and (II) ranging from 300to 20,000,-- before which
Column 8, line 52, insert --the group consisting of -- after from
Column 8, line 53, delete ","

Signed and Sealed this

Fourth Day of July, 1995

Attest:

BRUCE LEHMAN

Attesting Officer

Commissioner of Patents and Trademarks